(12) United States Patent
Pignataro et al.

(10) Patent No.: US 10,103,981 B2
(45) Date of Patent: Oct. 16, 2018

(54) BIER FORWARDING VALIDATION

(71) Applicant: Cisco Technology, Inc., San Jose, CA (US)

(72) Inventors: Carlos M Pignataro, Raleigh, NC (US); Nagendra Kumar Nainar, Morrisville, NC (US); Neale David Raymond Ranns, Basingstoke (GB)

(73) Assignee: Cisco Technology, Inc., San Jose, CA (US)

( * ) Notice: Subject to any disclaimer, the term of this patent is extended or adjusted under 35 U.S.C. 154(b) by 4 days.

(21) Appl. No.: 14/929,350

(22) Filed: Nov. 1, 2015

(65) Prior Publication Data
US 2017/0126481 A1    May 4, 2017

(51) Int. Cl.
| | |
|---|---|
| *H04L 1/00* | (2006.01) |
| *H04L 12/721* | (2013.01) |
| *H04L 29/08* | (2006.01) |
| *H04L 12/707* | (2013.01) |
| *H04L 12/26* | (2006.01) |
| *H04L 12/24* | (2006.01) |

(52) U.S. Cl.
CPC ............ *H04L 45/70* (2013.01); *H04L 41/069* (2013.01); *H04L 43/10* (2013.01); *H04L 45/22* (2013.01); *H04L 45/72* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 7,924,730 B1* | 4/2011 | McAllister | .......... | H04L 43/0811 370/248 |
| 8,374,095 B2 | 2/2013 | Boutros et al. | | |
| 8,504,718 B2 | 8/2013 | Wang et al. | | |
| 8,774,009 B2 | 7/2014 | Jocha et al. | | |
| 8,804,719 B2 | 8/2014 | Aldrin et al. | | |
| 2006/0221841 A1* | 10/2006 | Lee | ...................... | H04L 43/0811 370/242 |
| 2010/0238788 A1* | 9/2010 | Boutros | .............. | H04L 43/0811 370/216 |

(Continued)

OTHER PUBLICATIONS

Wijnands, Ijsbrand; Multicast Using Bit Index Explicit Replication (Mar. 6, 2015).

(Continued)

*Primary Examiner* — Bob A Phunkulh

(57) ABSTRACT

In one embodiment, a method, system, and apparatus is for storing an assigned operations, administration and management (OAM) bitstring in a memory in a BIER (Bit Index Explicit Replication) enabled router, the OAM bitstring being assigned to a BIER domain, the semantic of the OAM bitstring being to replicate and forward the OAM bitstring to neighboring bit-forwarding routers (BFRs), generating an OAM probe packet including the OAM bitstring, setting a BFR ID associated with a first BFR as a BIER header bitstring in the OAM probe packet, setting a TTL (time to live) field in the OAM probe packet to be 2, sending the OAM probe packet to a next hop BFR, and performing one of receiving the OAM probe packet back from the first BFR, and taking an alternative action if the OAM probe packet is not received back from the first BFR.

20 Claims, 9 Drawing Sheets

(56) References Cited

U.S. PATENT DOCUMENTS

| | | | | |
|---|---|---|---|---|
| 2010/0238812 A1* | 9/2010 | Boutros | ............ | H04L 45/00 |
| | | | | 370/249 |
| 2011/0222412 A1* | 9/2011 | Kompella | ............ | H04L 45/00 |
| | | | | 370/241.1 |
| 2012/0219003 A1* | 8/2012 | Cui | ............ | H04L 12/26 |
| | | | | 370/395.5 |
| 2013/0007252 A1* | 1/2013 | Welin | ............ | H04L 41/0213 |
| | | | | 709/223 |
| 2013/0259056 A1* | 10/2013 | Kotrabasappa | ............ | H04L 45/24 |
| | | | | 370/401 |
| 2013/0259059 A1* | 10/2013 | Yamada | ............ | H04L 41/24 |
| | | | | 370/401 |
| 2013/0272141 A1* | 10/2013 | Mashimo | ............ | H04L 43/18 |
| | | | | 370/248 |
| 2015/0131660 A1 | 5/2015 | Shepherd et al. | | |
| 2016/0134518 A1* | 5/2016 | Callon | ............ | H04L 45/24 |
| | | | | 370/390 |
| 2016/0134535 A1* | 5/2016 | Callon | ............ | H04L 45/48 |
| | | | | 370/390 |

OTHER PUBLICATIONS

Wijnands, Ijsbrand; Multicast Using Bit Index Explicit Replication (Sep. 22, 2014) Can be seen at: https://tools.ietf.org/html/draft-wijnands-bier-architecture-00.

Peterson, Larry et al.; Computer Networks—A systems approach (Fifth Edition), 2012; p. 218.

* cited by examiner

BIER FORWARDING VALIDATION

TECHNICAL FIELD

The present disclosure generally relates to aspects of BIER next hop validation.

BACKGROUND

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. Multicast is the preferred method of data forwarding for many networks. One reason for this is that multicast is a bandwidth-conserving technology that reduces traffic by simultaneously delivering data to multiple receivers. However, some network environments are not well suited to support multicast. Doing so in such environments often involves discovering and maintaining significant amounts of control, or state, information. Setting up and maintaining this control information has a tendency to become complex and costly in terms of computing resources, and can become a major limiting factor in overall network performance. Another issue with multicast is that due to packet delivery mechanisms used, packets are sometimes forwarded to locations to which the forwarding of these packets creates an unwelcome burden on network performance. Overcoming this burden by traditional means involves generation and maintenance of even more control information.

In conventional IP multicast forwarding, the packets of a given multicast "flow" are forwarded along a tree that has been constructed for the specific purpose of carrying that flow. This requires transit nodes to maintain state on a per-flow basis, and requires the transit nodes to participate in multicast-specific tree building protocols. The flow to which a packet belongs is determined by its IP source and destination address fields.

BIER (Bit Index Explicit Replication) is an alternative method of multicast forwarding. It does not require any multicast-specific trees, and hence does not require any multicast-specific tree building protocols. Within a given "BIER domain", an ingress node encapsulates a multicast data packet in a "BIER header". The BIER header identifies the packet's egress nodes in that domain. Each possible egress node is represented by a single bit within a bitstring; to send a packet to a particular set of egress nodes, the ingress node sets the bits for each of those egress nodes, and clears the other bits in the bitstring. A router that supports BIER is referred to as a Bit-Forwarding Router (BFR) will advertise its unique BFR-ID via IGP (i.e. the interior gateway protocol) and this information will be flooded to all nodes in the IGP domain. Each node will use this information to populate the forwarding table with Bit-ID details. Each packet can then be forwarded along the unicast shortest path tree from the ingress node to the egress nodes. Thus there are no per-flow forwarding entries.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

A method, system, and apparatus is described for storing an assigned operations, administration and management (OAM) bitstring in a memory in a BIER (Bit Index Explicit Replication) enabled router, the OAM bitstring being assigned to a BIER domain, the semantic of the OAM bitstring being to replicate and forward the OAM bitstring to neighboring bit-forwarding routers (BFRs), generating an OAM probe packet including the OAM bitstring, setting a BFR ID associated with a first BFR as a BIER header bitstring in the OAM probe packet, setting a TTL (time to live) field in the OAM probe packet to be 2, sending the OAM probe packet to a next hop BFR, and performing one of receiving the OAM probe packet back from the first BFR, and taking an alternative action if the OAM probe packet is not received back from the first BFR.

Figure 1:
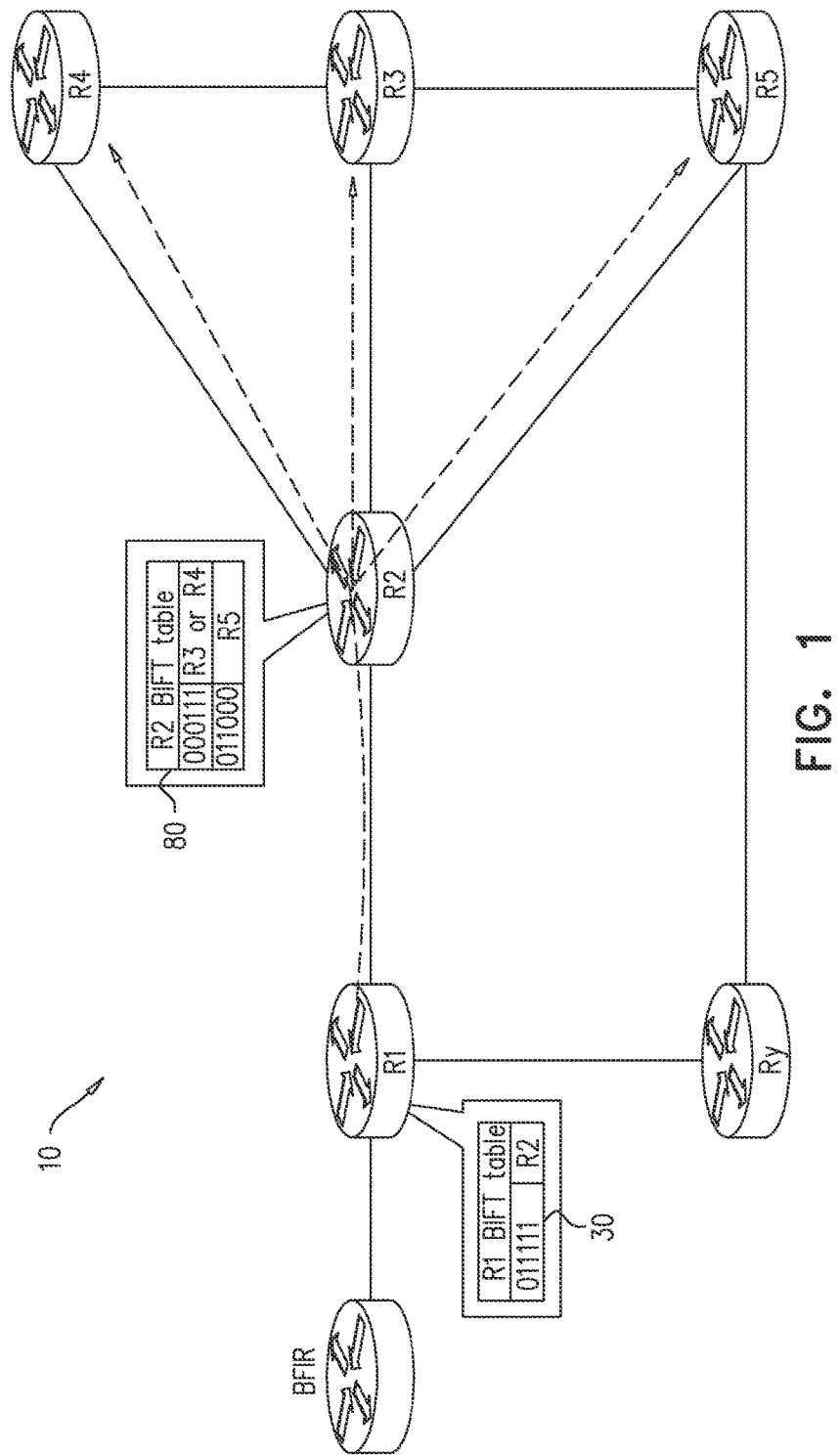
FIG. 1 is a simplified illustration of a network of Bit Forwarding Routers (BFRs) in which a method for next hop validation and for next hop forwarding validation are implemented, the BFR network constructed and operative in accordance with an embodiment of the present invention.

Reference is now made to FIG. 1, which is a simplified illustration of a network of Bit Forwarding Routers 10 (BFRs) in which a method for next hop validation and for next hop forwarding validation are implemented, the BFR network 10 constructed and operative in accordance with an embodiment of the present invention. The network of BFRs 10 comprises a first router, referred to as R1. R1 is a BIER enabled router, having a bit indexing forwarding table (BIFT) 30 which indicates, on the basis of a BIER header, to which next hop, i.e. neighboring, router, to forward packets. The exemplary BIFT 30 of R1 indicates that an incoming BIER packet with a BIER header of 011111 will be forwarded to neighboring router R2. R1 is depicted as having additional neighboring routers, one of which is simply labelled as being a bit-forwarding ingress router (BFIR). That is to say, a multicast data packet enters a BIER domain, such as the BFR network 10, at the BFIR. A second neighbor, Ry, is still another neighboring router of R1 on the BFR network 10. It is appreciated that R1 presumably has a more complete BIFT which includes neighboring routers BFIR and Ry, but for ease of depiction and ease of description, such lines in the BIFT of R1 are not mentioned herein.

As an aside, although the above example is for a case of an incoming BIER packet with a BIER header of 011111, it is appreciated that BitString in BIER header is not an exact match. In other words, a packet with a BitString of 011000 or 010000 or 000111—all matches this entry and will, accordingly, be forwarded to R2.

Besides router R1, router R2 has additional neighbors R3, R4, and R5. R2 also has a BIFT 80, which indicates that a packet with an incoming BIER header of 000111 will be forwarded to either neighboring router R3 or R4. The BIFT 80 also indicates that a packet with an incoming BIER header of 011000 will be forwarded to neighboring router R5.

There are at least two possibilities for R2 to drop a BIER packet after receiving the BIER packet from R1:

R2 may have a corrupted and/or disabled Label Forwarding Instance Base (LFIB) entry for BIER-Multiprotocol Label Switching (MPLS) label. The LFIB is an MPLS table where the router (i.e. R2 in this particular case) will store all known MPLS labels. MPLS, as is known in the art, is a mechanism in high-performance telecommunications networks that directs data from one network node to the next based on short path labels rather than long network addresses, thereby avoiding complex lookups in a routing table.

R2 may have a corrupted and/or a disabled BIER layer at its ingress linecard.

Each BIER domain will be assigned with an operations, administration and management (OAM) Bit-Forwarding Router (BFR) ID, comprising a bitstring which is unique within a given BIER domain. For instance, in the present example, the OAM BFR-ID is 100000. The forwarding semantic of the OAM BFR-ID in each node is to replicate and forward the bitstring to all BFR neighbors. Accordingly, as will be shown in FIGS. 2-4, a BFR that needs to validate the nexthop will perform the following steps:

Generate a continuity check OAM probe packet;
Set a BitString in BIER header in the OAM probe packet as the OAM BFR-ID; and
Set the OAM probe packet TTL (i.e., Time To Live) to 2, and send the OAM packet.

Figure 2:
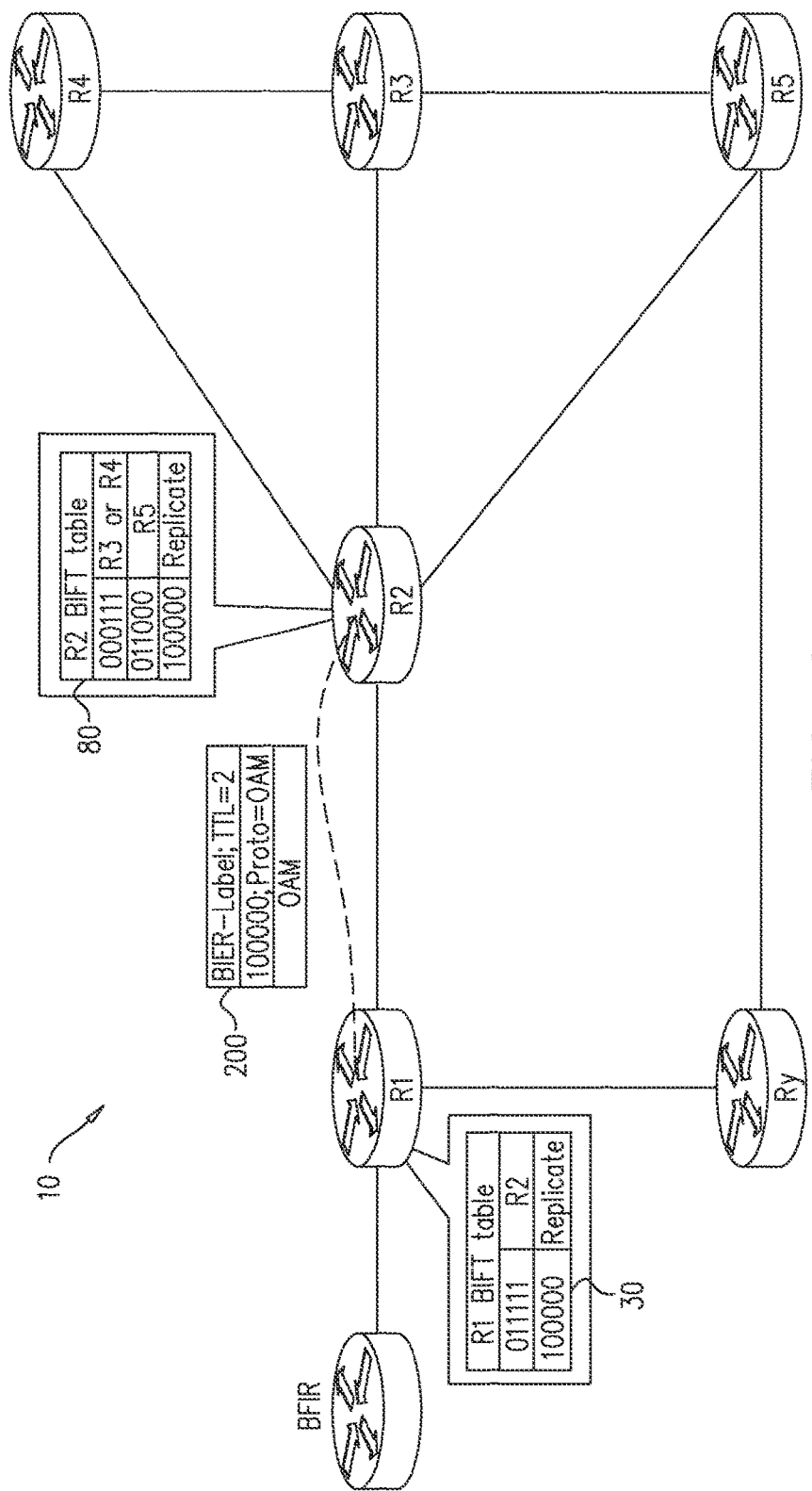
FIG. 2 is an illustration of a first stage of the method for next hop validation as implemented in the network of BFRs depicted in FIG. 1.

Reference is now made to FIG. 2, which is an illustration of a first stage of the method for next hop validation as implemented in the network of BFRs 10 depicted in FIG. 1. In the present example, R1 initiates validating the next hop forwarding capability of R2. R1 generates the continuity check OAM probe packet 200. The continuity check OAM probe packet 200 comprises a BIER MPLS label and sets the OAM probe packet 200 TTL to 2. The OAM bitstring, 100000 is included in the BIER header. The continuity check OAM probe packet 200 further comprises a BIER header of "{100000;Proto=OAM}".

The "proto" field depicted in the continuity check OAM probe packet 200 indicates a 4-bit field which identifies the type of the payload. (The "payload" is the packet or frame immediately following the BIER header.) Various values for the proto field are enumerated in the BIER standards. The proto field, as used in the present method, is set to a value indicative of an OAM packet.

It is appreciated that in general, BIER packets comprise a BIER header containing a bit string in which each bit represents a single BFR-id. To indicate that a particular BFER (Bit-Forwarding Egress Router) needs to receive a given packet, the BFIR sets the bit corresponding to that BFER's BFR-id in the sub-domain to which the packet has been assigned. The term "BitString" is used in BIER protocols by convention to refer to the bit string field in the BIER header. The term "payload" to refer to the packet that has been encapsulated. Thus a "BIER-encapsulated" packet consists of a "BIER header" followed by a "payload".

Each BFR populates its forwarding table to replicate any packet received with BitString in BIER header as OAM BFR-ID to all BFR neighbors irrespective of the incoming interface/neighbor. For example, R1 BIFT Table 30 and R2 BIFT Table 80 both now have the exemplary OAM BFR-ID populating a line: "100000, Replicate."

Figure 3:
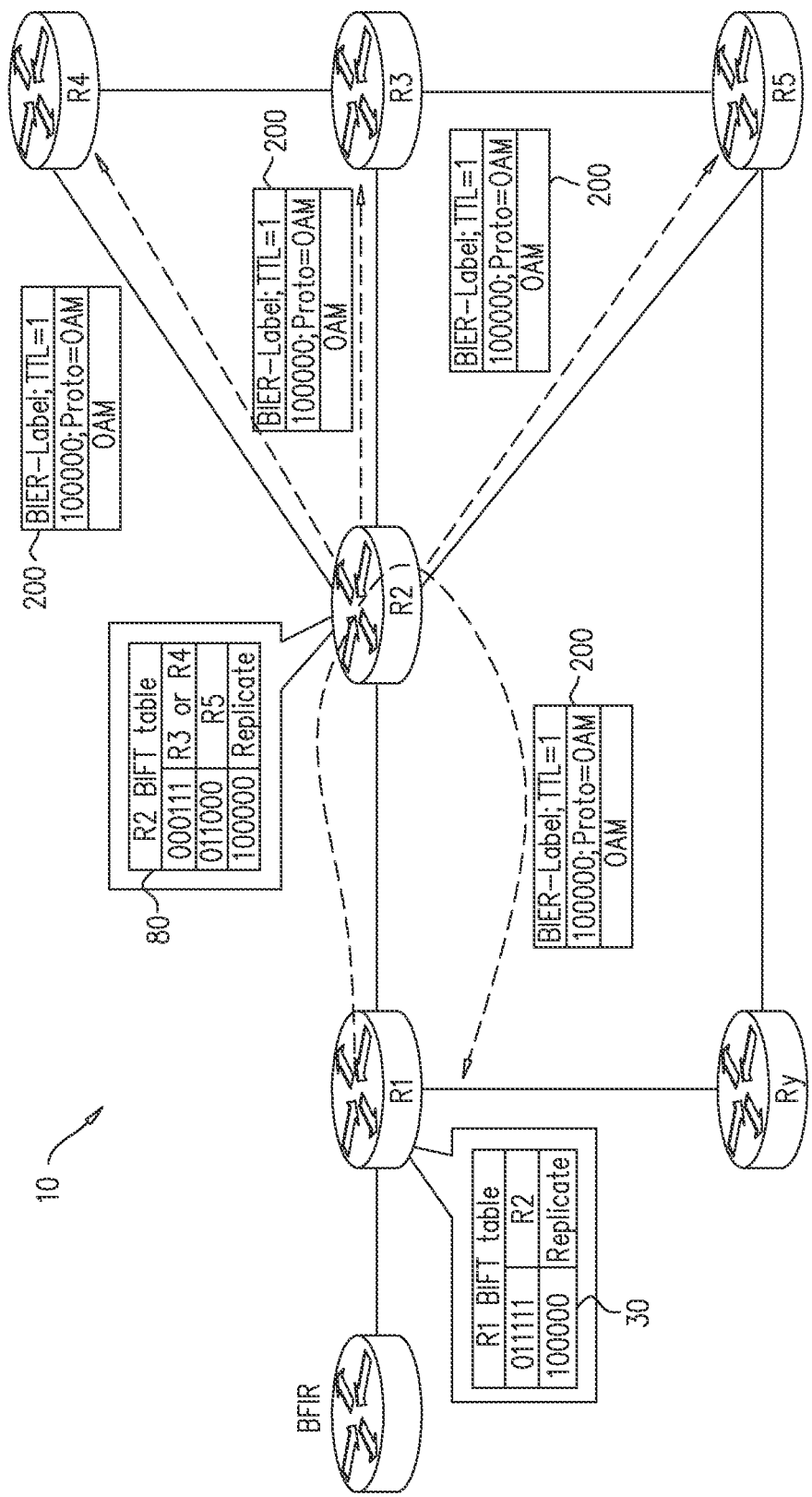
FIG. 3 is an illustration of a second stage of the method for next hop validation as implemented in the network of BFRs depicted in FIG. 1.

Reference is now made to FIG. 3, which is an illustration of a second stage of the method for next hop validation as implemented in the network of BFRs 10 depicted in FIG. 1. R2 receives the continuity check OAM probe packet 200. Upon receiving the continuity check OAM probe packet 200, R2 will decrement the TTL, so that the TTL is now set to 1, replicate the continuity check OAM probe packet 200, and forward the continuity check OAM probe packet 200 to all neighbors. In the present example, R2 will forward the continuity check OAM probe packet 200 to R1, R3, R4, and R5.

Assuming that there is no failure, and R2 is able to return the continuity check OAM probe packet 200 to R1, then, correspondingly, R1 will receive the continuity check OAM probe packet 200 back from R2. Because the continuity check OAM probe packet 200 TTL=1 and Proto as OAM, the continuity check OAM probe packet 200 will get passed to the OAM module resident in R1. Those of skill in the art will appreciate that The OAM module of a router fulfills the management and manipulation of the router. In this particular case, since the receipt of the returned continuity check OAM probe packet 200 indicates that there is no problem on router R2, then the OAM module on router R1 will reset the local timer for R2 Next Hop validation.

It is appreciated that there is no control plane involvement on R2. That is to say that R2 does not pass this OAM packet from R1 to its (i.e. R2's) OAM module for payload processing. Rather, R2 simply treats the OAM packet as like any other BIER packet.

Figure 4:
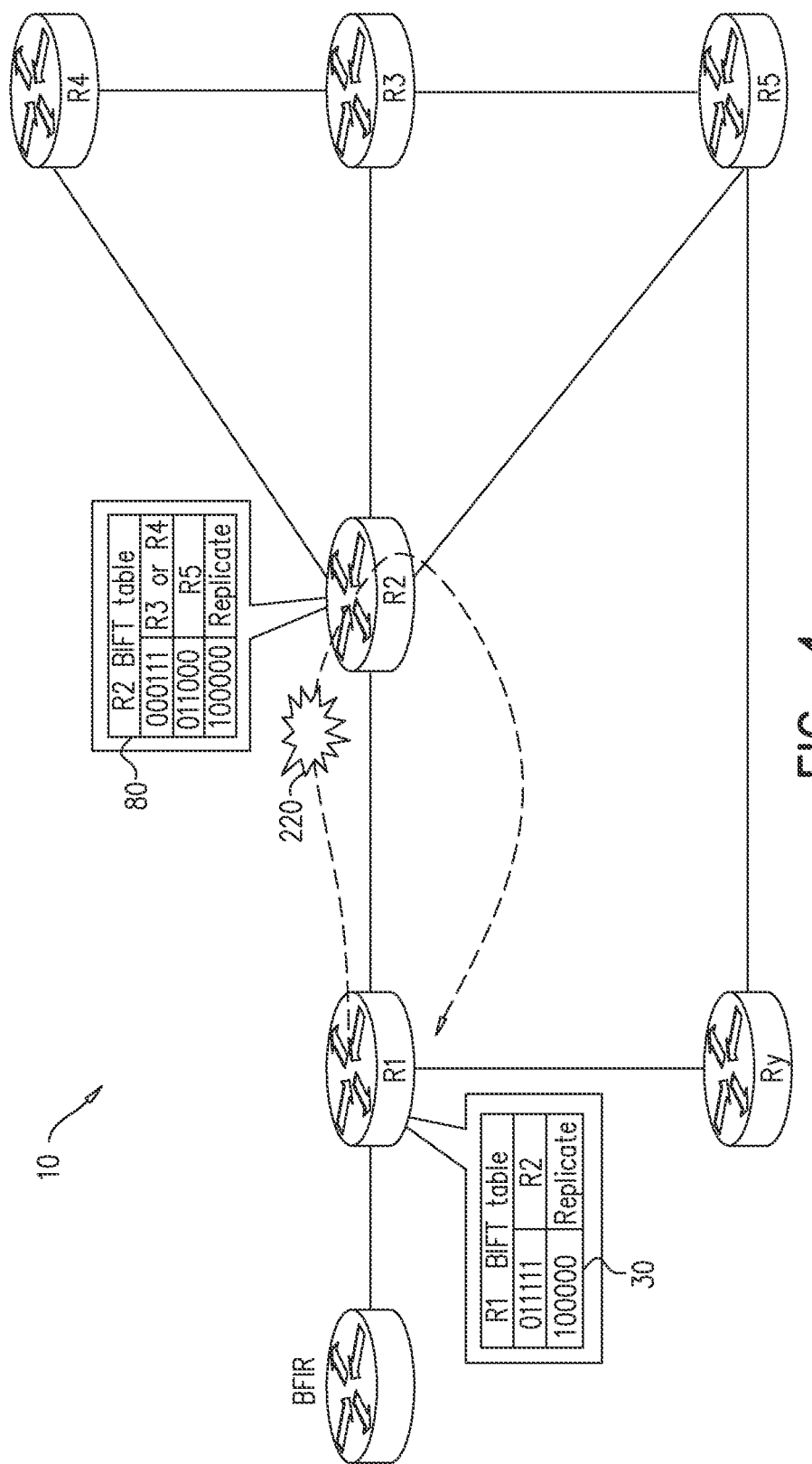
FIG. 4 is an illustration of a third stage of the method for next hop validation as implemented in the network of BFRs depicted in FIG. 1, the illustration depicting a failure condition.

Reference is now made to FIG. 4, which is an illustration of a third stage of the method for next hop validation as implemented in the network of BFRs 10 depicted in FIG. 1, the illustration depicting a failure condition The cause of the failure is depicted in FIG. 4 by an image 220 between routers R1 and R2. As was noted above, there are two typical causes which would result in R1 not receiving the continuity check OAM probe packet 200 back from R2. One would be because of a BIER layer failure on R2. The second typical cause would be due to a return path failure on R2.

If R1 does not receive an appropriate response to the continuity check OAM probe packet 200 from any nodes (R3, R4, or R5) after R2 was supposed to have forwarded the continuity check OAM probe packet 200, then the cause of the failure 220 is an R2 BIER layer failure. On the other hand, if R1 does receive the appropriate response to the continuity check OAM probe packet 200 from nodes R3, R4, and R5 after R2 was supposed to have forwarded the continuity check OAM probe packet 200, then the cause of the failure 220 is most likely a return path failure.

Figure 5:
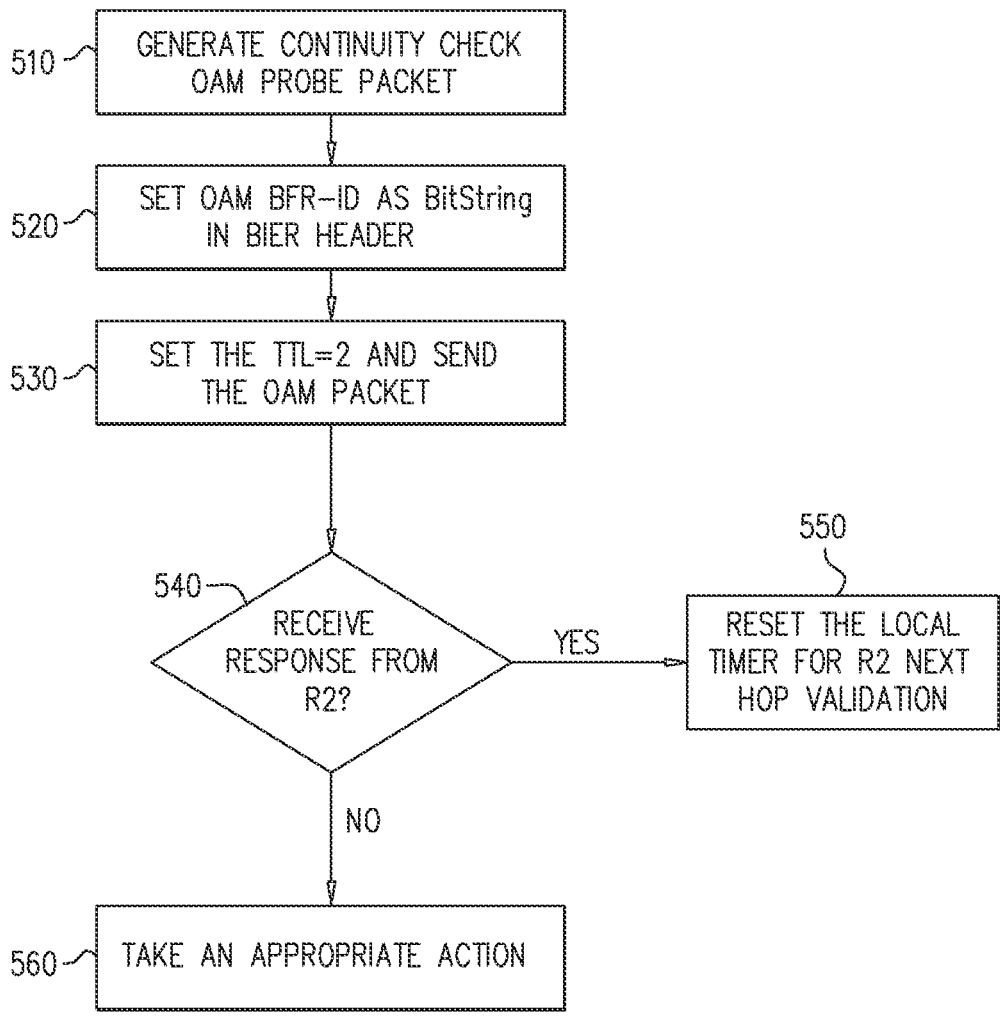
FIG. 5 is a flow chart summarizing the method for next hop validation.

Reference is now made to FIG. 5, which is a summary of the above described embodiment of the method for next hop validation. In step 510, router R1 generates the continuity check OAM probe packet 200. In step 520, router R1 sets the OAM BFR-ID as BitString in BIER header. In step 530, router R1 sets the TTL=2 and sends the continuity check OAM probe packet 200. After an appropriate amount of time, either router R1 has received a response from router R2 or not 540. If router R1 has received the appropriate response from router R2, then the OAM module on router R1 will reset the local timer for a future scheduled R2 Next Hop validation (step 550). It is appreciated that an amount of time which passes before a time out occurs is a local implementation matter, and may also vary depending on platform capacity.

Alternatively, if R1 has not received the appropriate response from router R2, then router R1 will take an appropriate response (step 560). Such an appropriate response might include router R1 taking a corrective action, such as, but not limited to:

logging an error message;

instructing a centralized logging system of the failure to receive back the OAM probe packet; and triggering a fast retransmit and recovery (FRR) action.

Figure 6:
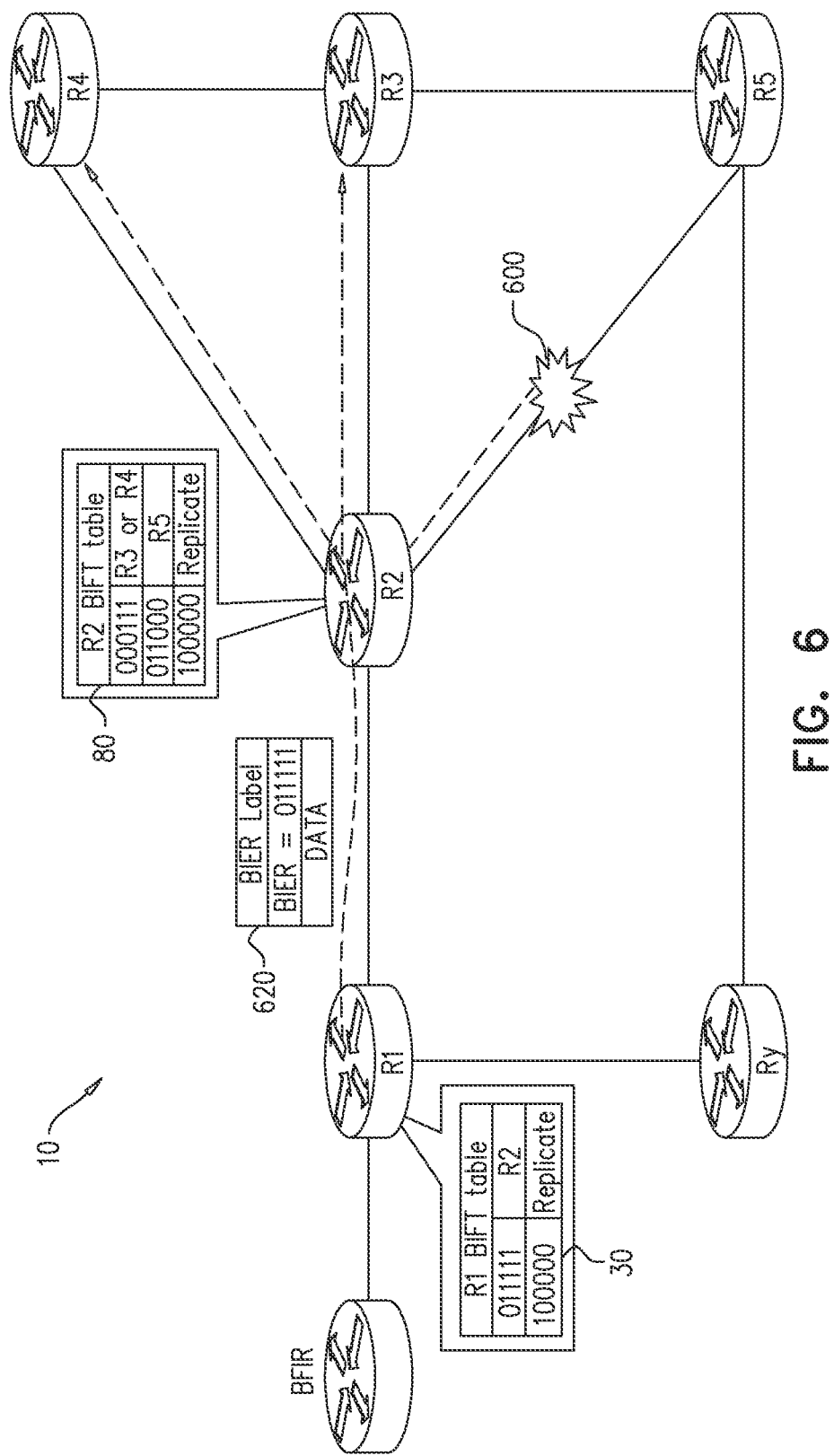
FIG. 6 is an illustration of a method for next hop forwarding validation as implemented in the network of BFRs depicted in FIG. 1.

Reference is now made to FIG. 6, which is an illustration of a method for next hop forwarding validation as implemented in the network of BFRs 10 depicted in FIG. 1. It will be appreciated that the method described above only validates basic next hop forwarding. However, that method may not be able to detect any corruption and/or a loop in actual forwarding. In the exemplary topology of the network of BFRs 10 in FIG. 6, some corruption 600 on the network path from R2 to R5 is causing BIER forwarding towards R5 to drop. More specifically, in the present example, R2's BIFT 80 indicates that 011000 is supposed to be forwarded to R5. But, it is suspected that there is some local programming corruption or some other issue along the path (e.g. a network "black hole"). The present method is intended to detect the corruption 600.

Typically, when forwarding a packet, the BFR (for example, R1, R2, R3, . . . ) locally detects which entry should be used. That is to say, the BFR performs some or all of the following methods to detect which other BFRs in its BIER domain should receive forwarded packets:

Consolidate all bit-IDs reachable via downstream node;

On-demand instruction from operator or centralized server; and

Self-learning from an active stream.

Accordingly, R1 validates the forwarding entry on next hop R2 and redirects packets via Ry in case of any failure. R1 runs SPF (Shortest Path First, an algorithm used by link state protocols like OSPF (Open Shortest Path First) or ISIS (Intermediate System-Intermediate System) to build the shortest path to destinations) with R2 as ROOT to detect the NNHOP (Next Next HOP). In this topology, R1 detects that R2 will use R5 as NHOP (Next HOP) for a BIER header of 011000 and R4 or R3 (via Equal-cost multi-path routing (ECMP)) for a BIER header of 000111.

Figure 7:
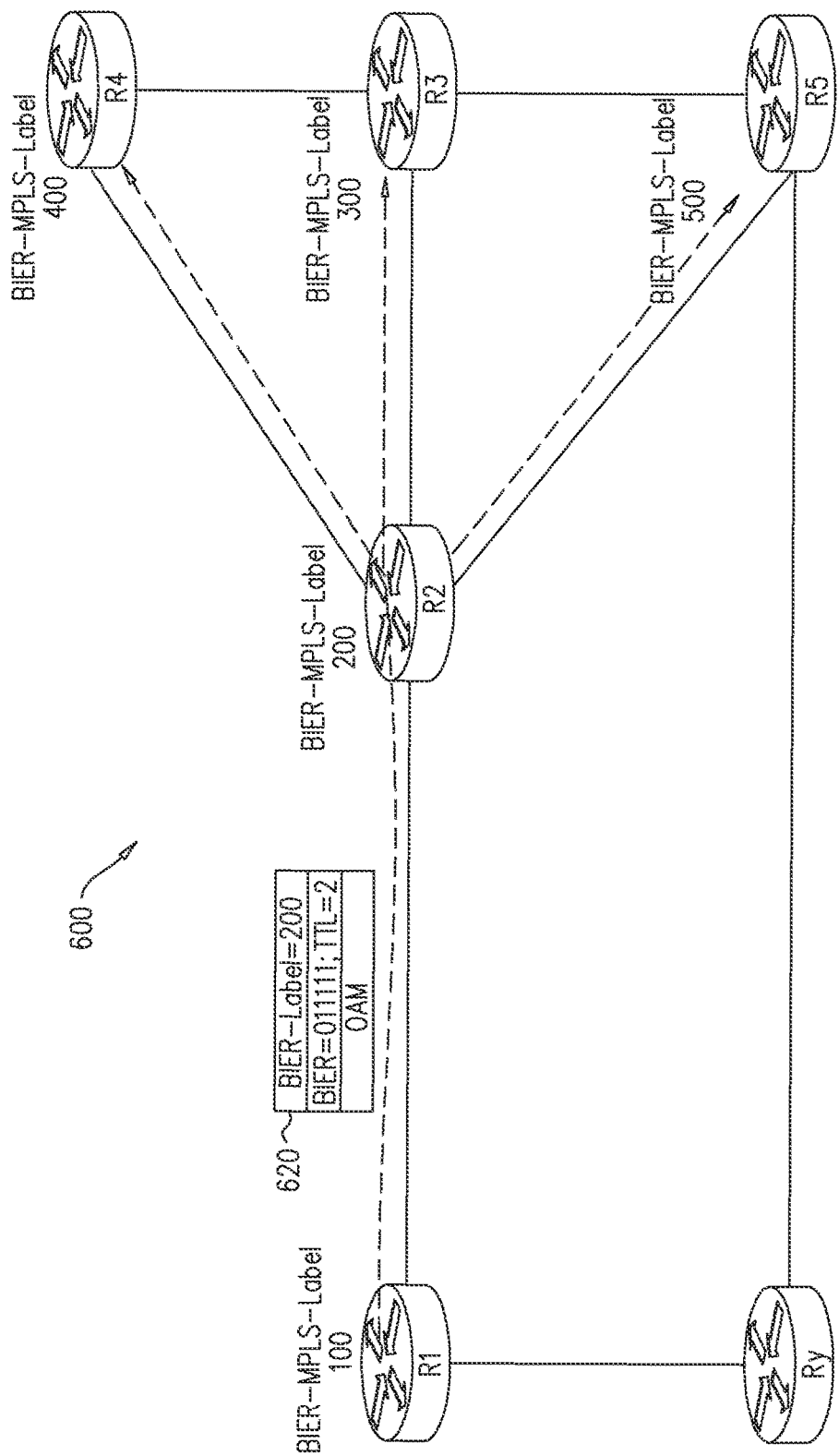
FIG. 7 is a depiction of the BIER network of FIG. 6 depicted with BIER MPLS Labels indicated.

Reference is now made to FIG. 7, which is a depiction of the BIER network 600 of FIG. 6 depicted with the following BIER MPLS Labels indicated:

| Router | BIER MPLS Label |
|--------|-----------------|
| R1 | 100 |
| R2 | 200 |
| R3 | 300 |
| R4 | 400 |
| R5 | 500 |

R1 creates a probe session using the following steps:

Generate OAM probe 620.

Set BFER-ID as BitString in BIER header. In this case, the OAM BFR-ID is not the next hop router (i.e. R2, as in the first embodiment, described above with reference to FIGS. 2-4), but rather the router which is suspected of being blocked by the corruption 600. This process is discussed above in the discussion concerning the BFR locally detecting which entry table should be used.

Include the BIER-MPLS Label advertised by R2 (i.e. BIER-MPLS Label=200), and set the TTL to 2.

As described above, R2 receives the OAM probe 620 and forwards it to its neighbors, as described below.

R1 expects a response from R5 as well as from R3 and R4. In the event that R1 does not receive a response from any NNHOP, R1 triggers FRR as in described above.

The R2 router receives the OAM probe 620 and forwards the OAM probe 620 packet to the NNHOP based on its forwarding table. That is to say, R2 forwards the OAM probe 620 packet to routers R3, R4, R5. These steps are analogous to the steps described above with reference to FIGS. 2 and 3.

As was mentioned above, in the present example, the corruption 600 is between routers R2 and R5. Accordingly, R1 receives the response from R3 and R4, but not from R5 due to the corruption 60 (i.e. a forwarding issue on R2 towards R5). Accordingly, R1 is able to take a corrective action and redirects packets for R5 via Ry in case of a detection of a failure.

It is appreciated that by changing the bitstring in the BIER header, R1 can perform the validation for different BIFT entries in the R2 BIFT. By way of example:

R1 is able to set all bitstrings that it uses R2 as downstream (011111 in this example [000111 AND 011000, where 000111 is the bitstring for R3 and R4, and 011000 is the bitstring for R5].)

R1 is able to randomly set different values for bitstring (000111, 000110, 000100 etc.); and R1 is able to set the bitstring by self-learning the current active bitstrings. The maximum number of session required from R1 to validate the NHOP BIFT table is, accordingly, equal to the number of BFR neighbors.

The methods and systems described herein may also be implemented in network architectures in which to BIER-TE (BIER Traffic Engineering) is implemented. As is known in the art, BIER-TE forwards and replicates packets like BIER based on a BitString in the packet header but does not require an IGP (interior gateway protocol). BIER-TE supports traffic engineering by explicit hop-by-hop forwarding and loose hop forwarding of packets. It also supports FRR for link and node protection and incremental deployment. BIER-TE is described in a draft RFC, found at tools.ietforg/html/draft-eckert-bier-te-arch-00

Figure 8:
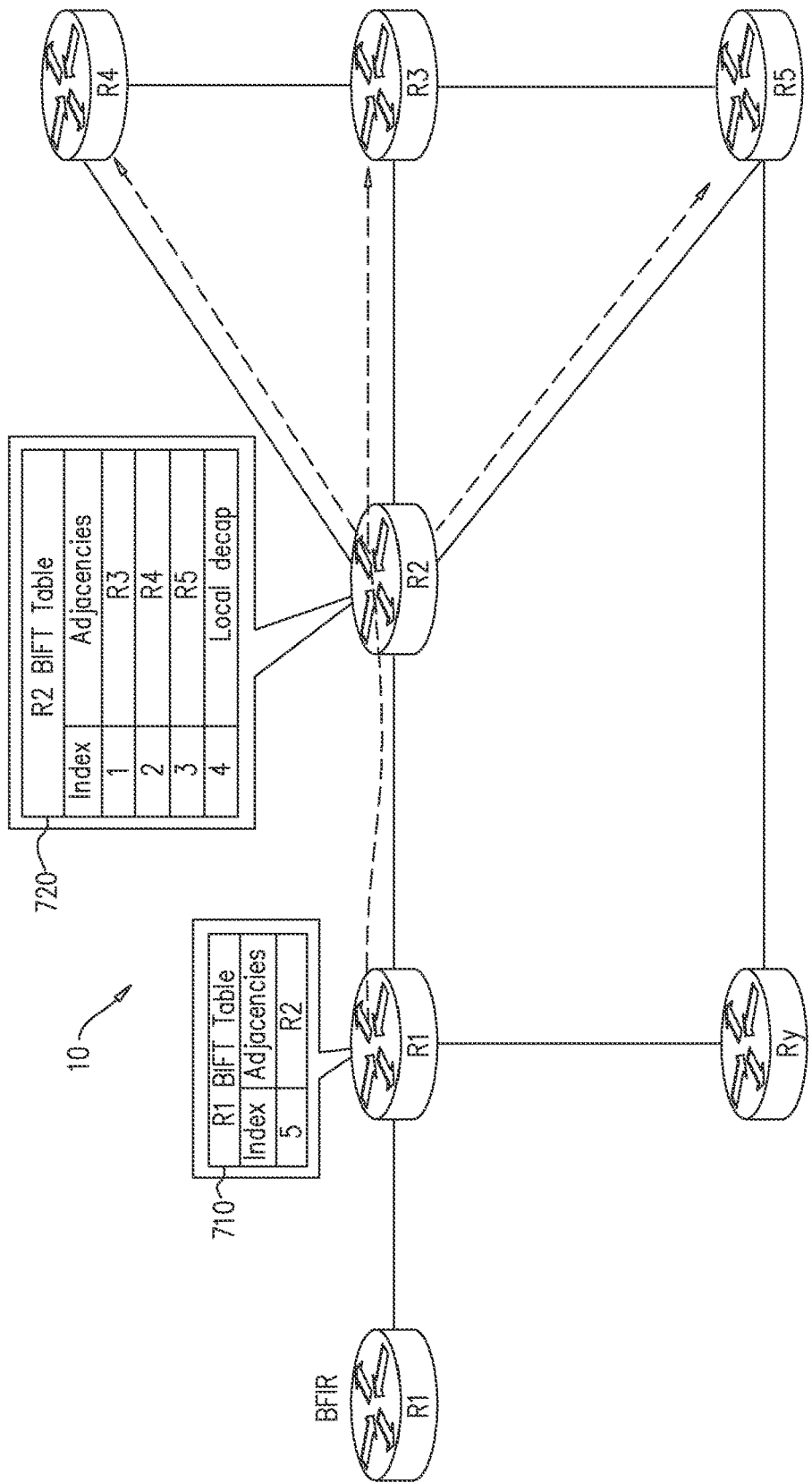
FIG. 8 is an illustration of another embodiment of the method for next hop forwarding validation in the network of BFRs depicted in FIG. 1, where BIER-TE is implemented.

Reference is now made to FIG. 8, which is an illustration of another embodiment of the method for next hop forwarding validation in the network of BFRs 10 depicted in FIG. 1, where BIER-TE is implemented. In the present example, as depicted in FIG. 1, the BFIR inserts an appropriate BitString into the BIER header of a packet which is forwarded to R1. The BitString indicates that, for the sake of example, the packet is to be forwarded by R1 to R2 (With BIER-TE as defined in the above-mentioned draft RFC, a Bit-ID is assigned to each adjacency). The BitString further indicates that R2 is to forward the packet over router R2's R4 adjacency, and over router R2's R5 adjacency.

FIG. 8 also depicts the BIER-TE adjacencies in the BIFT tables of R1, and R2: R1 BIFT table 710, and R2 BIFT table 720. The R1 BIFT table 710 shows an adjacency with R2. The R2 BIFT table 720 shows adjacencies with R3; R4; and R5. For ease of depiction, other adjacencies of router R1 besides R2 are not indicated in the R1 BIFT table 710. Similarly, other adjacencies of router R2 720, such as with router R1, are not indicated in the R2 BIFT table 720. An Index column, indicated in tables 710 and 720 in FIG. 8 defines the bit position and the associated adjacency. For example index 1 is for R3 and 2 is for R4. So if R2 receives a packet with BIER header as 00001, it will be forwarded to R3. If receives with 00010 it will be forwarded to R4. If receives with 00011, it will be forwarded to both R3 and R4 and so on.

In the embodiment of the present described for BIER-TE, a detection mechanism is in place enabling R1 to take alternative action if:
  there is a network failure ("black hole") and the packet is unable to reach R5; or
  there is corruption in the adjacency tables in R2, and the packet is forwarded to an incorrect neighboring router, say, to R3.

As is the case with BIER-TE, there is a BIER Controller Host (hereinafter, "the controller"), rather than a per-router BIER layer. The controller host tracks the BFR topology of the BIER-TE domain. In the present example, the controller will instruct R1 with the required adjacency details of R2, as required, i.e.:

| Adjacency Bit Index | 3 |
|---|---|
| NextHop | R5 |

The adjacency bit index is indicated in the R2 BIFT table 720.

R1 triggers the OAM probe packet (not depicted), similar to the OAM probe packet described above (such as continuity check OAM probe packet 200 (FIG. 2) and OAM probe 620 (FIG. 6)). In the present example, the bitstring is set to bit index 3 (00100), as indicated in the table above, and the TTL is set to 2. R1 expects to receive a response to the OAM probe packet from router R5. The OAM probe packet is forwarded by R1 to R2. R2 receives the probe packet, decrements the TTL to 1, and attempts to forward the OAM probe packet to router R5.

If there is a black hole for index 3 on R2, then R1 will not receive a response from R5, and the OAM probe will time out. In such a case, R1 can trigger FRR, as discussed above, and as is discussed in the BIER-TE specification mentioned above.

If there is corruption in the R2 adjacency tables, then R1 will receive a response to the OAM probe packet from router R3, instead of the expected response from router R5. In such a case, R1 can trigger FRR, as discussed above, and as is discussed in the BIER-TE specification mentioned above.

R1 may take other alternative actions in either or both of the above cases, such as the alternative actions mentioned above:

logging an error message;
instructing a centralized logging system of the failure to receive back the OAM probe packet.

Figure 9:
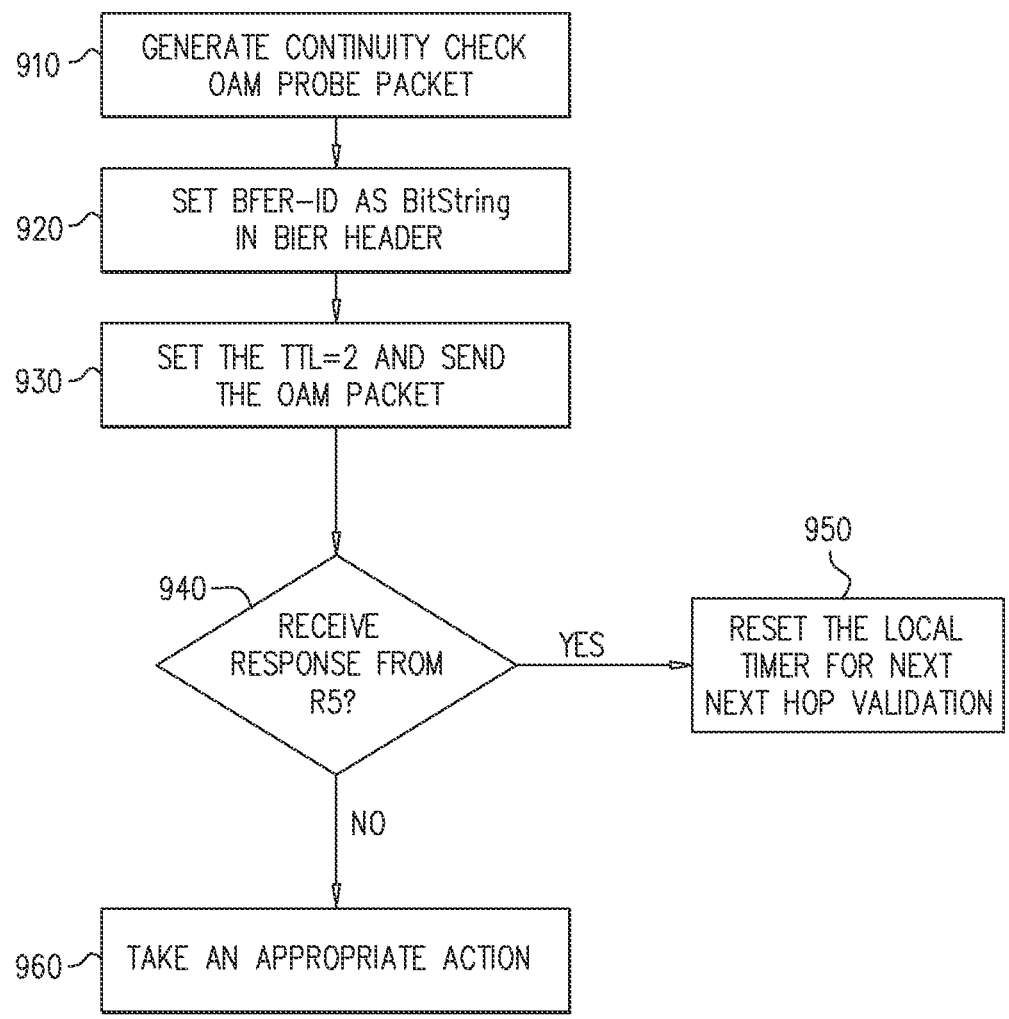
FIG. 9 is a flow chart summarizing some exemplary embodiments for next hop forwarding validation.

Reference is now made to FIG. 9, which is a flow chart summarizing some exemplary embodiments for next hop forwarding validation. In step 910, router R1 generates the OAM probe packet 620 (FIG. 6). In step 920, router R1 sets the BFER-ID used for data forwarding as Bitstring in BIER header. In step 930, router R1 sets the TTL=2 and sends the probe packet 620 (FIG. 6). After an appropriate amount of time (typically a matter of local implementation, and subject to due to platform capacity), either router R1 has received a response from router R5 or not 940. If router R1 has received the appropriate response from router R5, then the OAM module on router R1 will reset the local timer for Next Hop validation (step 950).

Alternatively, if R1 has not received the appropriate response from router R5, then router R1 will take an appropriate response (step 960). Such an appropriate response might include router R1 taking a corrective action, such as, but not limited to:
  logging an error message;
  instructing a centralized logging system of the failure to receive back the OAM probe packet; and
  triggering a fast retransmit and recovery (FRR) action.

It is appreciated that the BIER enabled routers described herein comprise at least one processor for performing the operations described hereinabove. In addition to the at least one processor, the BIER enabled routers described herein comprise non-transitory computer-readable storage media (i.e. memory). The memory may store instructions, which at least one of the processors may execute, in order to perform the method described herein. The system also comprises typical and standard hardware and software components as are known in the art.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
  storing an assigned operations, administration and management (OAM) bitstring in a memory in a BIER (Bit Index Explicit Replication) enabled router, the OAM bitstring being assigned to a BIER domain comprising a plurality of bit-forwarding routers (BFRs), the semantic of the OAM bitstring being to replicate and forward the OAM bitstring to next hop BFRs;

generating an OAM probe packet comprising the OAM bitstring;

setting a BFR ID associated with a first BFR as a BIER header bitstring in the OAM probe packet, wherein each of the plurality of BFRs in the BIER domain is represented by a single bit within the BIER header bitstring in the OAM probe packet, and wherein the BFR ID in the BIER header bitstring includes at least one bit representing the first BFR;

setting a TTL (time to live) field in the OAM probe packet to be 2;

sending the OAM probe packet to a next hop BFR within the BIER domain;

determining whether the OAM probe packet has been received back from the first BFR identified in the BIER header bitstring of the OAM probe packet; and upon determining that the OAM probe packet has not been received back from the first BFR, taking a corrective action.

2. The method according to claim 1 wherein the first BFR comprises the next hop BFR.

3. The method according to claim 1 wherein the first BFR comprises a next next hop BFR.

4. The method according to claim 1 wherein if the OAM probe packet is received back from the first BFR, then a local timer for next hop BFR validation is reset.

5. The method according to claim 1 wherein the corrective action comprises triggering fast retransmit and recovery (FRR).

6. The method according to claim 1 wherein the corrective action comprises logging an error message.

7. The method according to claim 1 wherein the corrective action comprises instructing a centralized logging system of the failure to receive back the OAM probe packet.

8. The method according to claim 1 wherein the BIER enabled router comprises a BIER-TE (BIER Traffic Engineering) enabled router.

9. The method according to claim 1 wherein the first BFR comprises a BIER-TE enabled router.

10. The method according to claim 1 wherein the OAM bitstring is assigned to an entire BIER domain.

11. The method according to claim 1 wherein the OAM bitstring is replicated and forwarded to all next hop BFRs.

12. A system comprising:
a memory in a BIER (Bit Index Explicit Replication) enabled router that stores an assigned operations, administration and management (OAM) bitstring, the OAM bitstring being assigned to a BIER domain comprising a plurality of bit-forwarding routers (BFRs), the semantic of the OAM bitstring being to replicate and forward the OAM bitstring to next hop BFRs;
an OAM probe packet generator which generates OAM probe packet comprising the OAM bitstring;
a processor which sets a BFR ID associated with a first BFR as a BIER header bitstring in the OAM probe packet, wherein each of the plurality of BFRs in the BIER domain is represented by a single bit within the BIER header bitstring in the OAM probe packet, and wherein the BFR ID in the BIER header bitstring includes at least one bit representing the first BFR, and also sets a TTL (time to live) field in the OAM probe packet to be 2;
the BIER enabled router operative to send the OAM probe packet to a next hop BFR within the BIER domain;
the BIER enabled router operative to:
receive the OAM probe packet back from the first BFR identified in the BIER header bitstring of the OAM probe packet; and
upon determining that the OAM probe packet has not been received back from the first BFR, take a corrective action.

13. The system according to claim 12 wherein the first BFR comprises one of: the next hop BFR; and a next next hop BFR.

14. The system according to claim 12 wherein if the OAM probe packet is received back from the first BFR, then a local timer for next hop BFR validation is reset.

15. The system according to claim 12 wherein the corrective action comprises one of: triggering fast retransmit and recovery (FRR); logging an error message; and instructing a centralized logging system of the failure to receive back the OAM probe packet.

16. The system according to claim 12 wherein the BIER enabled router and the first BFR comprise a BIER-TE (BIER Traffic Engineering) enabled router.

17. The system according to claim 12 wherein one of:
the OAM bitstring is assigned to an entire BIER domain; and
the OAM bitstring is replicated and forwarded to all next hop BFRs.

18. One or more non-transitory computer readable storage media encoded with instructions that, when executed by a processor, cause the processor to:
store an assigned operations, administration and management (OAM) bitstring in a memory in a BIER (Bit Index Explicit Replication) enabled router, the OAM bitstring being assigned to a BIER domain comprising a plurality of bit-forwarding routers (BFRs), the semantic of the OAM bitstring being to replicate and forward the OAM bitstring to next hop BFRs;
generate an OAM probe packet comprising the OAM bitstring;
set a BFR ID associated with a first BFR as a BIER header bitstring in the OAM probe packet, wherein each of the plurality of BFRs in the BIER domain is represented by a single bit within the BIER header bitstring in the OAM probe packet, and wherein the BFR ID in the BIER header bitstring includes at least one bit representing the first BFR;
set a TTL (time to live) field in the OAM probe packet to be 2;
send the OAM probe packet to a next hop BFR within the BIER domain;
determine whether the OAM probe packet has been received back from the first BFR identified in the BIER header bitstring of the OAM probe packet; and
upon determining that the OAM probe packet has not been received back from the first BFR, take a corrective action.

19. The one or more non-transitory computer readable storage media of claim 18 wherein the corrective action comprises one of: triggering fast retransmit and recovery (FRR); logging an error message; and instructing a centralized logging system of the failure to receive back the OAM probe packet.

20. The one or more non-transitory computer readable storage media of claim 18 wherein if the OAM probe packet is received back from the first BFR, then a local timer for next hop BFR validation is reset.

* * * * *